United States Patent [19]

Vali

[11] Patent Number: 4,641,021

[45] Date of Patent: Feb. 3, 1987

[54] VARIABLE BANDWIDTH LOW-PASS FILTER FOR LINE TRACER ACCURACY CONTROL

[75] Inventor: Enn Vali, Burlington, Canada

[73] Assignee: Westinghouse Canada Inc., Hamilton, Canada

[21] Appl. No.: 693,540

[22] Filed: Jan. 22, 1985

[30] Foreign Application Priority Data

Mar. 21, 1984 [CA] Canada ................................. 450133

[51] Int. Cl.[4] ........................ G05B 1/00; G05B 19/33; G05B 21/02
[52] U.S. Cl. .................................. 250/202; 318/636; 318/577
[58] Field of Search .......... 250/200, 201, 202, 214 R; 318/636, 577

[56] References Cited

U.S. PATENT DOCUMENTS 3,727,120 4/1973 Jewell et al. .................. 318/577 X
3,883,735 5/1975 Murphy et al. ..................... 250/202

Primary Examiner—Eugene R. LaRoche
Assistant Examiner—David Mis
Attorney, Agent, or Firm—Edward H. Oldham

[57] ABSTRACT

In a circular scanning pattern tracing system having a sample and hold circuit, the width of the sample pulse is made adjustable. This variable width is equivalent to a variable low pass filter in the system. The effective cut off frequency of the filter is made dependent on the system tangential tracing velocity.

3 Claims, 1 Drawing Figure

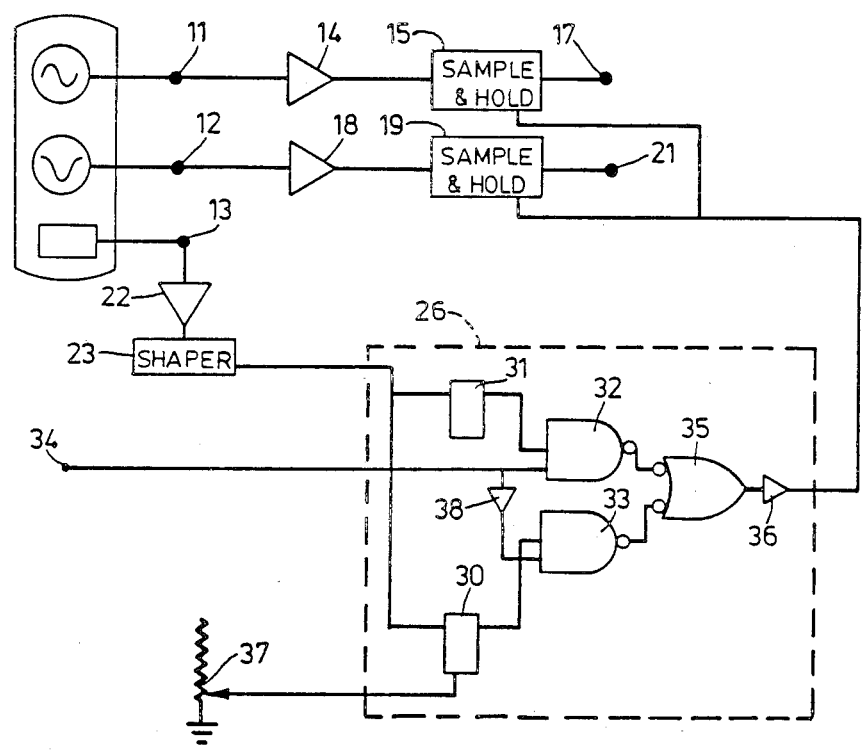

VARIABLE BANDWIDTH LOW-PASS FILTER FOR LINE TRACER ACCURACY CONTROL

BACKGROUND OF THE INVENTION

This invention relates to optical pattern tracing controls and in particular, circular scanning non steering controls, the type described in U.S. Pat. No. 3,883,735 issued May 13, 1975 to Francis P. Murphy et al.

Optical pattern following devices which depend on circular scanning optics of the type described in the foregoing patent tend to have errors as they pass around corners caused by the difference between the point of rotation and the point of actual scan of the pattern. This difference, referred to as lead, is essential to the operation of the system. The amount of lead required depends upon the speed of tracing. The greater amount of lead provided, the greater tendency to undershoot at corners. In the system described in the foregoing patent, a circular scanner produces a pair of sinusoids which represent the position of the scanner, in its circular scan, as a sine wave and a cosine wave, and a sensing pulse representing the instant when the scan crosses the pattern. These signals are combined in sample and hold circuits, and sample the sine wave and cosine wave at a time determined by the traverse of the pattern by the scan. As has been previously described in U.S. Pat. No. 3,883,735, a sample and hold circuit generally consists of means to produce a sample pulse, which is in this case the sensing pulse indicating the traverse of the pattern by the scan, and uses it to sample the sine wave or cosine wave. A sample and hold circuit normally samples the amplitude of the sine or cosine wave at a time determined by the sample pulse and stores the value in a capacitor. By selection of the capacitor and the width of the sample, it is possible to produce the effect of a low pass filter by requiring that several samples be applied to the capacitor before substantial change in potential is produced. This function has been disclosed and claimed in U.S. Pat. No. 3,727,120.

SUMMARY OF THE INVENTION

In accordance with the present invention, the width of the sample pulse is made adjustable thus introducing a variable low pass filter into the system. This variable low pass filter cut off frequency is made to depend upon the velocity of the system, the lower the tracer speed the lower the cut off frequency. In this way, the system can be made to trace more accurately at low speed where the delay introduced by the low pass filter compensates for the effect of the lead. Since the response time of the system is changed, the low pass effect is controlled in such a manner as to become greater at low speed.

DESCRIPTION OF THE DRAWING

The single sheet of drawings is a schematic diagram of a portion of the control system of such a line tracer incorporating the present invention.

PREFERRED EMBODIMENT

Considering the single FIGURE of drawings, there is shown the scanner including the two sine generators generating sinusoids at 90° phase angle to each other and the photo scanner. The output at terminal 11 will be referred to as the sine wave and the output at terminal 12 as the cosine wave and the output at terminal 13 is the signal output from the photo scanner. The outputs from terminal 11 and 12 are applied through amplifiers 14 and 18 to sample and hold circuits 15 and 19 which produce outputs at terminals 17 and 21 which represent the coordinate signals necessary to control the Y drive and the X drive respectively and cause the machine to follow the pattern in a manner well known to those skilled in the art and more completely described in the foregoing U.S. Pat. No. 3,883,735. The output at terminal 13 is applied through amplifier 22 to shaper 23 and thence to sample pulse generator 26. Sample pulse generator 26 includes two monostables 30 and 31 both which are triggered by the output from shaper 23. The outputs from the monostables are applied to a pair of nand circuits 32 and 33 and an enable signal from terminal 34 is applied to both of the nand circuits. The output from the nand circuits 32 and 33 is applied to nand circuit 35 and through amplifier 36 to the sample and hold circuits. The width of the pulse produced by monostable 30 is determined by the value of resistor 37 which is a portion of a multi section potentiometer which includes the normal speed control.

OPERATION

The system operates substantially as before by sampling sine and cosine waves in sample and hold circuits 15 and 19. However, rather than a simple standard width of sample pulse, the sample pulse width is determined by the selection of monostable 31 or 30. When the enable signal is applied to terminal 34, the sample pulse is derived from monostable 30. When no such signal is applied to terminal 34 the sample pulse is derived from monostable 31. The inverter 38 coupled between the input terminals of nand 32 and nand 33 causes these nands to operate in reverse modes. The duration of the pulse produced by monostable 31 is determined by a resistor which is adjustable but of selected value. The pulse width of monostable 30 on the other hand is determined by potentiometer 37 which is a section of the speed control potentiometer of the system. By selection of the value of the potentiometer 37, the duration of the pulse from monostable 30 may be selected for any particular tracer so that the cornering ability is improved by the value of the low pass filter introduced into the system by the selection of the pulse width.

The enable signal applied to terminal 34 is provided by a switch on the operators console or by a contact on the speed selection switch which selects either high or low speed operation. In this way, the system can be made operable only during low speed operation.

I claim:

1. A circular scanning optical pattern tracer including an optical scanner, means in said scanner to produce a reference sine wave, a reference cosine wave and a sensing pulse indicative of the time the scan intercepts the pattern, a pair of sample and hold circuits for producing coordinate signals representative of the coordinate velocities required to drive a servo system which moves the machine tangential to the pattern, means to apply said sine wave to one of said sample and hold circuits and means to apply said cosine wave to the other of said sample and hold circuits, means to derive a first and a second sampling pulse from said sensing pulse means and to selectively apply said first or said second sampling pulse to said sample and hold circuits and means to alter the duration of said first sampling pulse over a range of values such that the duration of said sampling pulse determines the frequency response of said sample and hold circuits.

2. A system as claimed in claim 1 wherein said second sample pulse is supplied for high speed operation of the tracer and said first sample pulse is supplied for low speed operation of the tracer.

3. A system as claimed in claim 1 wherein the duration of the first said sample pulse is varied inversely as the speed of the system.

* * * * *